June 6, 1972 A. BAIN 3,667,858
CONDUIT REAMING MEANS
Filed Oct. 19, 1970
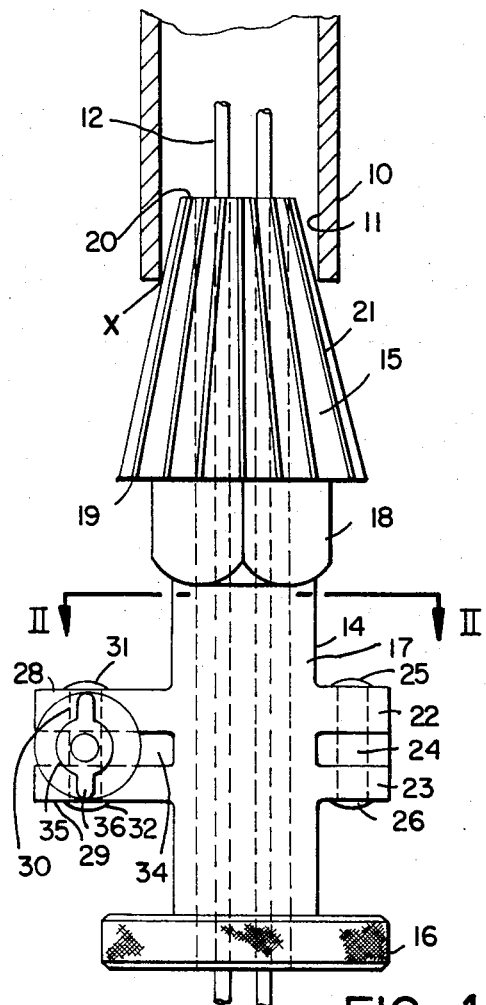
FIG_1
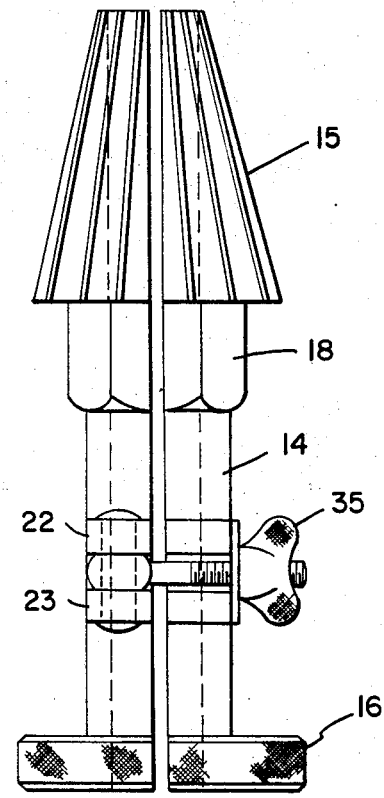
FIG_4
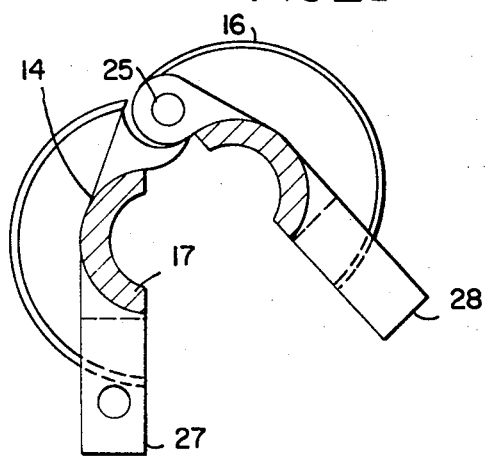
FIG_3
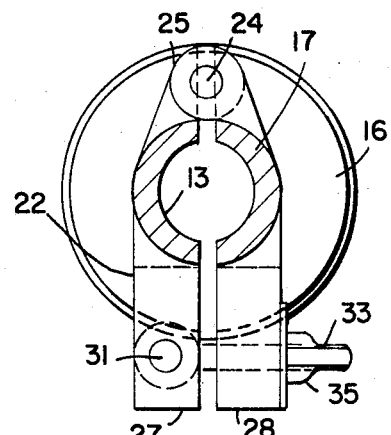
FIG_2
INVENTOR.
ANDREW BAIN
BY
Mellin, Moore & Weissenberger
ATTORNEYS 3,667,858
CONDUIT REAMING MEANS
Andrew Bain, 2440 Greenwich St.,
San Francisco, Calif. 94123
Filed Oct. 19, 1970, Ser. No. 81,659
Int. Cl. B23d 77/12
U.S. Cl. 408—229            10 Claims

ABSTRACT OF THE DISCLOSURE

Means are provided for reaming out a hollow elongated conduit containing wires extending therethrough and out one end thereof. The means includes a housing having a hollow cavity and separable into two parts so that the wires can be placed along the cavity and the two parts locked together. The housing includes a conically-shaped reaming portion which is then extended into the conduit and the inner wall of the conduit can be reamed without removing the wires therefrom.

BACKGROUND OF THE INVENTION

Field of the invention

The invention relates to the reaming of conduits; and, more particularly, to means for reaming a hollow electrical conduit without the necessity of removing wires therefrom.

Description of the prior art

The cutting of metal conduits in lengths to form a particular installation for wiring or the like by a saw or shear frequently leaves burrs about the cut edges which must be removed to avoid damaging the insulation on wires when they are being pulled through the conduit, and also to remove the hazard of injury caused by such burrs to the electrician's hands.

One such prior art device for accomplishing this is described in a U.S. patent to Kissinger et al., Ser. No. 2,875,651. This reaming device is attached to a handle and is inserted down into the conduit and rotated therein to accomplish the desired reaming. However, frequently such conduits already have electrical wires extending therethrough which cannot be conveniently removed. Thus, with the Kissinger et al. device, it is necessary to pull these wires before reaming can be accomplished resulting in considerable electrician downtime and the problems of rewiring the conduits.

SUMMARY OF THE INVENTION

It is an object of this invention to provide means for reaming hollow electrical conduits having wires extending therethrough.

It is a further object of this invention to provide such reaming means which can be used without the necessity of removing wires extending through and out of such conduits.

These and other objects are preferably accomplished by providing a housing having a hollow cavity and separable into two parts so that the wires can be placed along the cavity and the two parts locked together. The housing includes a conically-shaped reaming portion which is then extended into the conduit and the inner wall of the conduit can be reamed without removing the wires therefrom.

BRIEF DESCRIPTION OF THE DRAWINGS

FIG. 1 is a vertical, partly sectional, view of reaming means in accordance with my invention;

FIG. 2 is a view taken along lines II—II of FIG. 1;

FIG. 3 is a view similar to FIG. 2 but showing the device in its open position with portions thereof omitted for convenience of illustration; and FIG. 4 is a vertical view of the device of FIG. 1 oriented 90° with respect thereto.

DESCRIPTION OF THE PREFERRED EMBODIMENT

Referring to FIG. 1 of the drawing, an elongated hollow electrical conduit 10 is shown which is generally of metal or similar material and has an inner wall 11 upon which imperfections and/or burrs or the like may be formed, as discussed hereinabove. A plurality of electrical wires 12 are shown leading from or to a suitable power source and extending out one end of conduit 10 as shown. Although the reaming means of my invention will be described hereinbelow with respect to the reaming of a conduit having wires extending therethrough, it of course may be used to ream a conduit without such wires therein. However, my particular reaming means is especially effective in quickly and readily reaming electrical conduits having wiring already in place.

Thus, as shown in FIG. 1, the wires 12 extend out of conduit 10 and through a cavity 13 formed in a reaming device 14. These wires 12 may then extend to either a second conduit or to a source of power or the like while conduit 10 may be reamed without their removal.

Reaming device 14 has a reaming portion 15 at one end and an enlarged knurled handle portion 16 at the other, separated by a central body portion 17. Any suitable means may be used to secure reaming portion 15 to body portion 17. For example, as shown, a reaming portion 15 may be provided with a nut 18 or the like which threads onto suitable threading means (not shown) formed on the outer periphery of body portion 17. As will be discussed further hereinbelow, nut 18 must be a split ring-type nut, that, is separable into two parts.

Reaming portion 15 is generally tapered or conical in shape with the base 19 thereof engaging the body portion 17 and its apex 20 adapted to extend into conduit 10 as shown. Although surface is shown as conical, it may of course be equivalent thereto, such as convex or the like. The only requirement is that the reaming portion 15 be smaller at its lead end than its trailing end so as to be able to be inserted into conduits of varying internal diameters.

A plurality of spaced blades 21 or the like extend along the outer surface of reaming portion 15 thus forming a cutting surface. In this manner, the generally conical shape of reaming portion 15 forms a tapered surface covering the minimum, intermediate and maximum internal diameters of the conduits upon which it is to be used. Thus, at least a portion of the cross-sectional diameter of reaming portion 15 conforms to the internal diameter (i.e., inner wall 11) of conduit 10 so that the conduit 10 may be reamed as will be discussed further hereinbelow.

Referring both to FIGS. 1 and 2, the reaming device 14 is preferably formed of two separable halves which can be readily bolted or otherwise secured together to form a unitary reaming device. Of course, device 14 may be formed of a plurality of separable elements so bolted together to form a single unitary reaming device in accordance with my invention. Thus, body portion 17 may include a pair of spaced flanges, 22 and 23 or the like integrally formed on or otherwise secured to body portion 17. A pivot pin 24 extends through one end of both flanges 22 and 23 on one side thereof and includes enlarged head portions 25 and 26 at each end thereof to thereby secure it in position. The flanges 22 and 23, on the side opposite pin 24, may include extension portions on each half of the respective flange. Thus, for example, upper flange 22 may include an extension portion 27 on one half of flange 22 and an extension portion 28 on the other (see FIG. 2). In like manner, lower flange 23 (FIG. 1) may include an extension portion 29 on one half of flange 23 and a similar extension portion on the other half of flange 23 (this latter extension portion being rearwardly of portion 29 in FIG. 1 and below portion 27 in FIGS. 2 and 3 and thus not visible on the drawing). As can be seen in FIG. 2, these portions are in vertical spaced alignment.

Thus, a second pivot pin 30, having headed portions 31 and 32, may extend through extension portion 27 on flange 22 and the vertically aligned extension portion on lower flange 23. Pin 30 is similar to pin 24 but further includes a threaded shaft 33 normal thereto which extends into the space 34 formed between upper and lower extension portions 28 and 29 (see FIG. 1). In this manner, a locking nut 35 or the like may be threaded on the end of shaft 33 to secure the flanges 22 and 23 and thus the remaining portions of device 14 which is integral therewith into mating and locking engagement. This nut 35 includes an elongated head 36 which, when in the position shown in FIG. 1, serves to maintain the two halves of device 14 in mating engagement.

FIG. 3 shows the two halves of device 14 wherein the pin and nut 35 have been omitted for convenience of illustration. Thus, as can be seen, both halves of device 14 can be readily pivoted to an open position and wires 12 of FIG. 1 placed within cavity 13 (FIGS. 1 and 2). The halves are then locked together by threading nut 35 onto shaft 33 (FIG. 2). The device 14 is now inserted into the end of conduit 10 that it is desired to ream. By grasping handle portion 16, the device 14 can be rotated within conduit 10 with the blades 21 of reaming portion 15 scraping against and reaming inner wall 11 while wires 12 are maintained out of engagement with blades 21 by their position within cavity 13 (i.e., the walls of cavity 13 maintain wires 12 out of engagement with blades 21). Thus, electrical conduits, having wires already in place, may be readily and efficiently reamed without the necessity of removing the wires therefrom.

Although a particular type of locking means for device 14 has been described, obviously any suitable type may be used. In fact, the two halves (or a plurality of sections to form a unitary device) may be completely separable, then formed about wires 12 and locked into engagement by any suitable means. Also, the pivot pins 24 and 30 and nut 35 may be mounted on device 14 in any suitable manner.

As can be seen in FIG. 1, the cross-sectional diameter of reaming portion 15, at point X, that is, at its point of engagement with the inner wall 11 of conduit 10, is equal to the internal cross-sectional diameter of conduit 10. Thus, the tapering or generally conical shape of reaming portion 15 results in a reaming portion having a plurality of diameters conforming to the minimum, intermediate and maximum internal conduit diameters with which the device 14 is to be used.

Although the invention has been described hereinabove with respect to electrical conduits, such conduits may include any type of tubing, piping, etc. which it is desired to ream.

FIG. 4 shows a view of reaming device 14 oriented 90° with respect to its position in FIG. 1. The two halves of the device can be readily seen locked into operative position. By inserting the device 14 into conduit 10 as discussed hereinabove, the burrs or the like on the wall thereof may be reamed without disturbing wires already in place. Should difficulties be encountered in removing certain of the burrs, handle portion 16 may be grasped and a wrench or the like applied to nut 18 to thereby forcefully remove such burrs.

I claim as my invention:

1. A device for reaming out a hollow elongated conduit containing wires extending therethrough comprising:
    an elongated housing having an open-ended cavity extending along the longitudinal axis thereof for receiving said wires therethrough;
    said housing being separable on both sides of said cavity into at least two separate housing members with one portion of said cavity being formed by one member and the other portion of said cavity being formed by the other member, the mating of said portions forming said cavity;
    releasable securing means associated with said members for selectively locking said members in mating engagement to thereby form said cavity; and
    said housing including a reamer portion carried by one end thereof having longitudinally extending reaming means on the outer surface thereof for reaming the inner wall of said conduit, said reamer portion having a leading end and a trailing end and of varying cross-sectional diameter from the leading end to the trailing end thereof, the smaller cross-sectional diameter of said reamer portion being at its leading end.

2. The device of claim 1 wherein said housing includes a knurled handle portion at the end thereof opposite said reamer portion for grasping and turning said device.

3. The device of claim 1 wherein said separable housing members are generally semi-circular in cross-section and said releasable securing means includes pivot means pivotally attaching one of said semi-circular housing member to the other on one side thereof and releasable locking means carried by the other side of each of said semi-circular housing members.

4. The device of claim 1 wherein said reamer portion is generally cone-shaped with said leading end comprising the apex of said cone-shaped reamer portion.

5. The device of claim 1 wherein said reaming means comprises a plurality of spaced blades extending longitudinally of said reamer portion.

6. Apparatus for reaming out a hollow elongated conduit containing wires extending therethrough and out at least one end thereof, said apparatus comprising:
    an elongated housing having an open-ended cavity extending along the longitudinal axis thereof for receiving said wires therethrough;
    said housing being separable on both sides of said cavity into at least two separate housing members with one portion of said cavity being formed by one member and the other portion of said cavity being formed by the other member, the mating of said portions forming said cavity;
    releasable securing means associated with said members for selectively locking said members in mating engagement to thereby form said cavity;
    said housing including a reamer portion carried by one end thereof having longitudinally extending reaming means on the outer surface thereof for reaming the inner wall of said conduit, said reamer portion having a leading end and a trailing end and of varying cross-sectional diameter from the leading end to the trailing end thereof, the smaller cross-sectional diameter of said reamer portion being at its leading end with at least a cross-sectional portion of said reamer portion substantially conforming to the inner diameter of said conduit.

7. The apparatus of claim 6 wherein said housing includes a knurled handle portion at the end thereof opposite said reamer portion for grasping and turning said reamer portion within said conduit to thereby scrape the inner wall thereof.

8. The apparatus of claim 6 wherein said separable housing members are generally semi-circular in cross-section and said releasable securing means includes pivot means pivotally attaching one of said semi-circular housing members to the other on one side thereof and releasable locking means carried by the other side of each of said semi-circular housing members.

9. The apparatus of claim 6 wherein said reamer portion is generally cone-shaped with said leading end comprising the apex of said cone-shaped reamer portion.

10. The apparatus of claim 6 wherein said reaming means comprises a plurality of spaced blades extending longitudinally of said reamer portion for scraping against and thus reaming the inner wall of said conduit.

References Cited
UNITED STATES PATENTS 3,559,514   2/1971   Brownfield _____ 408—205

ANDREW R. JUHASZ, Primary Examiner

M. KOCZO, Jr., Assistant Examiner

U.S. Cl. X.R.

82—4 C